US012735567B2

(12) United States Patent
Bhargava et al.

(10) Patent No.: US 12,735,567 B2
(45) Date of Patent: Sep. 15, 2026

(54) BIOBASED NYLON WITH IMPROVED DEGRADATION

(71) Applicant: Shakespeare Company LLC, Greer, SC (US)

(72) Inventors: Saumitra Bhargava, Clarksville, MD (US); Samantha M. Sanders, Columbia, SC (US); Piyush Dave, Elgin, SC (US)

(73) Assignee: Shakespeare Company, LLC, Greer, SC (US)

( * ) Notice: Subject to any disclaimer, the term of this patent is extended or adjusted under 35 U.S.C. 154(b) by 579 days.

(21) Appl. No.: 18/179,799

(22) Filed: Mar. 7, 2023

(65) Prior Publication Data

US 2023/0279225 A1 Sep. 7, 2023

Related U.S. Application Data

(60) Provisional application No. 63/268,946, filed on Mar. 7, 2022.

(51) Int. Cl.

*C08L 77/02* (2006.01)
*A01D 34/416* (2006.01)
*A01D 101/00* (2006.01)
*C08J 3/20* (2006.01)

(52) U.S. Cl.

CPC .......... *C08L 77/02* (2013.01); *A01D 34/4168* (2013.01); *C08J 3/203* (2013.01); *A01D 2101/00* (2013.01); *C08J 2377/02* (2013.01); *C08J 2403/02* (2013.01); *C08J 2467/04* (2013.01); *C08L 2201/06* (2013.01); *C08L 2205/03* (2013.01)

(58) Field of Classification Search

CPC ............. A01D 2101/00; A01D 34/4168; C08J 2377/02; C08J 2403/02; C08J 2467/04; C08J 3/203; C08K 5/13; C08K 5/5313; C08L 2201/06; C08L 2205/03; C08L 3/02; C08L 67/04; C08L 77/02; C08L 77/06

See application file for complete search history.

(56) References Cited

U.S. PATENT DOCUMENTS

2022/0022373 A1* 1/2022 Beljean .................... D01F 8/12

* cited by examiner

*Primary Examiner* — Ana L. Woodward
(74) *Attorney, Agent, or Firm* — Eversheds Sutherland (US) LLP

(57) ABSTRACT

Trimmer line compositions and methods for forming trimmer line compositions are provided. The trimmer line compositions include a biodegradable toughening agent and polycaprolactone and advantageously increase the degradability of the trimmer line with minimal-to-no impact on the performance of the composition as trimmer line.

19 Claims, No Drawings

BIOBASED NYLON WITH IMPROVED DEGRADATION

CROSS REFERENCE TO RELATED APPLICATION

This application claims priority to U.S. Provisional Patent Application No. 63/268,946, filed Mar. 7, 2022, which is incorporated herein by reference.

FIELD OF THE DISCLOSURE

This disclosure relates generally to polymer formulations and, in particular, relates to nylon-based trimmer line formulations with improved degradation.

BACKGROUND

String trimmer line, also referred to as trimmer line or monofilament, is designed for use in string trimmer machines for cutting or trimming grass, weeds, or other vegetation. The machines are often used to edge around trees, near fences, and along driveways, sidewalks, and walls, as well as along landscape borders. String trimmer machines operate at speeds of up to about 10,000 revolutions per minute (rpm), and the combination of high speeds and the rigidity of the objects against which the trimmer line is impacted means the trimmer line must be capable of withstanding impacts and the heat-generation that results from impact while retaining the flexibility necessary to be inserted into a trimmer line holder eyelet. These various needs are typically met by nylon-based polymers.

The repeated impact of trimmer line on vegetation and rigid objects like concrete, metal fences, or bricks results in breakage of trimmer line. This breakage results in small pieces of trimmer line having sizes of around 0.5 cm to 4 cm in length being deposited in the landscape where the string trimmer machine is used. Polymers such as nylon do not readily degrade in the environment; nylon trimmer line is expected to take 10,000-50,000 years to degrade in soil. As a result, deposited fragments of broken trimmer line contribute to plastic waste.

One previous attempt at increasing the biodegradability of trimmer line involves the use of petroleum-based polymers with prodegradant catalysts, such as Echo® Oxo-Biodegradable Line from YAMABIKO Corporation, Tokyo, Japan or Bio Trim™ Trimmer Line from B Tool, Inc., Portland, Oregon, USA. The catalysts are responsible for initiating abiotic degradation that disintegrates the trimmer line particles into soil through exposure to oxygen and heat. The resulting particles may then go through biotic degradation. However, photo-oxidative fragmentation still produces micro-plastics, and the unbroken, usable trimmer line must be protected from direct sunlight to prevent premature degradation. Furthermore, any premature burial of the fragmented trimmer line stops the photo-oxidative degradation. Finally, petroleum-based polymeric trimmer line is less durable than nylon trimmer line, even without premature degradation due to sun exposure.

Another previous attempt at increasing biodegradability of trimmer line involves the use of bio-based polymers, such as poly(3-hydroxybutyrate-co-3-hydroxyhexanoate) (PHBH), as seen in Bio-line from Laser Sales Inc., Ontario, Canada, polylactic acid (PLA) polymers, or modified starch-based polymers. However, these bio-based polymers are less durable than nylon, which typically presents as higher breakage during use.

Yet another attempt at increasing biodegradability of trimmer line involves the use of commercially available bioplastics such as polylactic acid, polyhydroxyalkanoate, polyhydroxybutyrate, polybutylene succinate, or starch. However, trimmer line formed exclusively from bioplastics is ineffective as trimmer line as the trimmer line is incapable of withstanding impacts without melting at the eyelet of the holder. Although these bioplastics may be combined with nylon, there is a low ceiling for the amounts of these bioplastics that may be incorporated into nylon-based formulations and still retain desirable trimmer line properties. What results is a trimmer line that breaks more easily than nylon-based trimmer line and still takes hundreds to thousands of years to degrade.

Accordingly, improved trimmer line formulations are needed for overcoming one or more of the technical challenges described above.

DETAILED DESCRIPTION

In certain embodiments, trimmer line compositions and methods of making trimmer line compositions are provided herein, including trimmer line compositions having a nylon component, a biodegradable toughening agent, and caprolactone. In particular, it has been unexpectedly discovered that the inclusion of caprolactone stabilizes the formation of crystalline inclusions when the biodegradable toughening agent is compounded with the nylon component, improving the mechanical properties of the resulting trimmer line and significantly improving the degradability of the nylon-based trimmer line.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

As used herein, the term "about" with reference to dimensions refers to the dimension plus or minus 10%.

Trimmer Line Compositions

Trimmer line compositions are disclosed herein. In some embodiments, the trimmer line compositions include a nylon component, a biodegradable toughening agent, and polycaprolactone. As used here, a "trimmer line" refers to an extruded monofilament suitable for use in a string trimmer machine. Trimmer line is typically formed by combining individual components in a compounder to form plastic pellets. These pellets are then melted to form a viscous melt that is extruded through a die having a shape corresponding to the desired cross-sectional shape of the trimmer line. The trimmer line compositions of the present disclosure result in trimmer line that advantageously perform as well or better than conventional nylon-based trimmer lines while being capable of extrusion on standard equipment and use in standard trimmer line machines.

In some embodiments, the nylon component includes nylon 6, nylon 66, nylon 610, nylon 12, nylon 6/66, nylon 66/6, nylon 6/69, nylon 6/610, nylon 6/611, mixtures thereof, copolymers thereof, and/or blends thereof. In some embodiments, the nylon component has a sulfuric acid viscosity (SAV) of from about 2.2 to about 5.0. As used herein, a "sulfuric acid viscosity" refers to the viscosity of the nylon component when incorporated into a solution of 96% sulfuric acid, a common rheological characterization technique. Without intending to be bound by any particular theory, it is believed that a SAV of from about 3.3 to about 4.4 is favorable for trimmer line formulations, while an SAV of from about 2.2 to 3.3 is favorable for nylon-based injection molded parts.

In some embodiments, the nylon component has an enthalpy of first melting of at least 45 J/g and a melting point of at least 180° C. Without intending to be bound by any particular theory, it is believed that a nylon component having an enthalpy of first melting of at least 45 J/g and a melting point of at least 180° C. contribute to the formation of a trimmer line having a suitable thickness without being susceptible to melting when subjected to repeated impacts during use. In some embodiments, the enthalpy of first melting of the resulting trimmer line composition is from about 48 J/g to about 63 J/g. In some embodiments, the enthalpy of first melting of the trimmer line composition is from about 7% to about 30% lower than a conventional nylon-based composition.

In some embodiments, the nylon component is present in an amount of from about 69% to about 90% by weight of the trimmer line composition. In some embodiments, the biodegradable toughening agent is present in an amount of from about 5% to about 30% by weight of the trimmer line composition. In some embodiments, the polycaprolactone is present in an amount of from about 1% to about 10% by weight of the trimmer line composition.

In some embodiments, the biodegradable toughening agent includes starch, polyhydroxyalkanoate (PHA), polyhydroxybutyrate (PHB), polybutylene succinate (PBS), polybutylene adipate terephthalate (PBAT), polyvinyl alcohol (PVA), a copolymer thereof, or a blend thereof. These biodegradable toughening agents have low glass transition temperatures and are immiscible in the nylon component which results in the formation of inclusion domains of various sizes in the polymer melt. These inclusions result in variations in processing parameters and performance as trimmer line. However, it has been unexpectedly discovered that the addition of polycaprolactone stabilizes the formation of inclusion domains through homogenization of the size of the domains and produces a trimmer line composition with mechanical properties comparable to conventional nylon-based trimmer lines, but with significantly improved biodegradability.

In some embodiments, the biodegradable toughening agent includes a thermoplastic starch. In some embodiments, the thermoplastic starch includes pea starch, glycerin, and PBS.

In some embodiments, the trimmer line composition includes a stabilizer. In some embodiments, the stabilizer includes a blend of a hindered phenolic antioxidant and a phosphite, such as Irganox® B1171, available commercially from BASF SE, Ludwigshafen, Germany.

In some embodiments, a trimmer line formed from the trimmer line composition described herein experiences a weight loss during use that is equal to or less than a conventional nylon-based trimmer line. As used herein, "weight loss" refers to the loss of trimmer line material in the form of breakage. The ability for a trimmer line to resist breakage and weight loss corresponds to the toughness of the trimmer line. In practice, optimizing the properties of trimmer line requires balancing flexibility and toughness. If the trimmer line is too flexible, it deforms when spinning in the trimmer machine, which involves speeds of up to 10,000 rpm, resulting in an ineffective cutting volume. If the trimmer line is too rigid, the trimmer line is hard to load into the trimmer machine head.

In some embodiments, at least 30% of the composition anaerobically degrades after 480 days, as measured by ASTM D5511. In some embodiments, at least 4% of the composition aerobically degrades after 90 days, as measured by an ASTM D5338 test modified to run at 46° C.

Methods for Producing Trimmer Line

Methods for producing trimmer line are also disclosed herein. In one aspect, the methods include producing trimmer line from a trimmer line composition described above. In another aspect, the method includes compounding a nylon component, a biodegradable toughening agent, and polycaprolactone in a compounder to produce a blend. The method further includes extruding the blend through an extruder to produce the trimmer line.

In some embodiments, the method includes compounding the composition in a twin screw compounder. In some embodiments, the screw is configured for both distributive and dispersive mixing.

EXAMPLES

The disclosure may be further understood with reference to the following non-limiting examples.

Example 1: Benefits of Polycaprolactone to Mechanical Properties

Two trimmer line compositions were compounded and injection molded to form tensile bars. The compositions are detailed in Table 1.

TABLE 1

Trimmer line compositions for tensile property measurement

| Sample ID | Starch (wt %) | Polycaprolactone (wt %) | Nylon 6 (wt %) |
|---|---|---|---|
| N3 | 18 | 4 | 78 |
| N4 | 18 | 0 | 82 |

The compositions were compounded on a 40 L/D Leistritz twin screw compounder, available commercially from Leistritz Group, Nuremberg, Germany. The nylon 6 and polycaprolactone were fed into the main feed hopper on the compounder. The starch was added through a side feeder. The screw in the twin screw compounder was designed for a balance of both distributive and dispersive mixing. The compounded product was strand cut.

The tensile properties of the compositions were measured according to ASTM D638 on an Instron® 3366 dual column tabletop testing system, available commercially from Instron Corporation, Norwood, Massachusetts, USA. A 10 kN load cell was used and an "XL" long travel extensometer was used to record strain data. The crosshead speed was set to 2.0 inches/minute with "ASTM Type I Dog Bone Sample." The results of the test are presented in Table 2.

TABLE 2

| Results of Tensile Property Measurements | | |
|---|---|---|
| Sample ID | Modulus (kpsi) | Elongation at break |
| N3 | 231 | 216% |
| N4 | 161 | 220% |

As shown in Table 2, the inclusion of polycaprolactone significantly increased the modulus of the trimmer line, an increase of over 40%, with only a 1.8% reduction in the elongation at break.

Example 2: SEM Analysis

The tensile bar samples in Example 1 were cooled in liquid nitrogen (around −320° F.) for 30 minutes and allowed to fracture. A fractured piece from each sample was reduced in size using a saw without disturbing the fractured surface. Each piece was sputtered with gold and placed in an SEM. The SEM was operated at an accelerating voltage of 10 keV and images ranging in magnification from 500× to 10,000× were taken. Twenty inclusion domains were randomly selected from the images taken at 5,000× magnification and the size was measured using the software supplied with the SEM. Sample N3 featured a wide variation in inclusion domain size, so the particles were separated into two regimes: "small" inclusion domains including those with a size of 3 μm or less, and "large" inclusion domains including those with a size greater than 3 μm. The mean inclusion domain size is presented in Table 3.

TABLE 3

| Particle Size Comparison | | |
|---|---|---|
| Sample ID | Mean Domain Size (Small) (μm) | Mean Domain Size (Large) (μm) |
| N3 | 2.27 ± 0.79 | None Observed |
| N4 | 1.97 ± 0.49 | 5.21 ± 1.88 |

As shown in Table 3, no inclusions having a size greater than 3 μm were observed in sample N3, which included polycaprolactone. This demonstrates the unexpected benefit of controlling inclusion domain size when polycaprolactone is included in the trimmer line composition, which beneficially increases consistency in processability and composition properties.

Example 3: Benchtop Durability Tests of Trimmer Lines

Trimmer line samples were formed by the process described in Example 1 having the compositions described in Table 4.

TABLE 4

| Benchtop Durability Test Compositions | | | | | |
|---|---|---|---|---|---|
| Sample ID | Thermoplastic Starch (wt %) | Polycaprolactone (wt %) | Irganox ® B1171 (wt %) | Nylon 6 (wt %) | Nylon 6, 69 (wt %) |
| A | 10 | 2 | | 88 | |
| B | 15 | 3 | | 82 | |
| C | 15 | 4 | | 77 | 4 |
| D1 | 18 | 4 | 0.5 | 73.5 | 4 |
| D2 | 18 | 0 | | 77.5 | 4 |

The thermoplastic starch (TPS) was prepared with water and glycerin plasticizers. Water was driven away using vents and vacuum in one/multiple barrel sections of the extruder. Hot face palletization of thermoplastic starch minimized the water level in the TPS compound. This resulting TPS compound was added to nylon 6 and other degradable polymers and compounded again. Excess water decreased viscosity of nylon 6 resulting in TPS domains to be larger. This in turn impacted mechanical properties of molded or extruded articles. Excess water can also hydrolyze other degradable polymers impacting mechanical properties and processing.

Samples B, D1, and D2 were further analyzed using differential scanning calorimetry to determine the enthalpy of first melting, enthalpy of crystallization, peak melting point, and peak crystallization temperature. These parameters were compared to nylon 6, nylon 6/69, and NX747, a nylon alloy. There results of this analysis are presented in Table 5.

TABLE 5

| DSC Analysis of Trimmer Line Samples | | | | |
|---|---|---|---|---|
| Formulation | Enthalpy first melting (J/g) | Enthalpy of crystallization (J/g) | Peak melting point ($1^{st}$ heat) (° C.) | Peak crystallization temp (° C.) |
| Nylon 6 | 68 | 64 | 222 | 180 |
| Nylon 6/69 | 62 | 44 | 203 | 154 |
| Formula B | 63 | 57 | 220 | 179 |
| Formula D1 | 48 | 48 | 220 | 170 |
| Formula D2 | 54 | 47 | 218 | 168 |
| NX747 | 71 | 57 | 217 | 168 |

Each sample had a round cross-section to ensure that the shape of the line did not vary the cutting performance between samples. Each sample was prepared the benchtop durability testing by first cutting the sample line into 180 pieces, each 8.6 inches in length. These pieces were conditioned for at least 48 hours in a high humidity environment (90-95% humidity). Once conditioned, the pieces were grouped into pairs and each pair weighed prior to testing. The pairs were fed into a Shakespeare® 2-Line Fast Loader trimmer head that was installed on a Ryobi® RY15124 10-Amp Corded trimmer machine. The trimmer was mounted on an apparatus that allows the testing medium (brick, chain-link fence, wood fence) to move back and forth to meet the trimmer line as its spinning. The trigger on the trimmer was held down while the testing medium was moved back and forth 10 times, each time oscillating from 6 inches to 3 inches away from the head itself. The trimmer speed was between 8,000-10,000 rpm. Once the line hit the testing medium 10 times, it was taken out and reweighed to calculate the percent weight loss. This process was repeated 30 times for all three mediums: brick, wood fence, and chain-link fence. Once all 90 tests were completed, an overall average weight loss can be determined for that sample. The results of the benchtop durability test are displayed in Table 6.

TABLE 6

Benchtop Durability Test Results

| | Median % loss | | |
|---|---|---|---|
| | Chain-link fence | Wood fence | Brick |
| Arnold Brand Green | 18 | 3 | 7 |
| Laser Brand Tan | 31 | 15 | 25 |
| Oregon White | 20 | 2 | 10 |
| Formulation D1 | 17 | 3 | 4 |
| Formulation D2 | 22 | 8 | 10 |
| NX747 | 23 | 3 | 18 |
| Nylon 6 | 21 | 2 | 19 |
| Average | 22 | 5 | 13 |

As shown in Table 6, the inventive formula performs well or better than commercial trimmer lines available for sale. Table 5 also demonstrates the benefits of adding polycaprolactone; sample D1 experience less material loss than sample D2 against all three mediums.

Example 4: Field Studies of Trimmer Line Performance

Field tests are inherently challenging to standardize. The brush and weeds cut by the trimmer line differs slightly on every pass of the trimmer head. Furthermore, the angle and RPM of the trimmer head can vary between each field study. In order to retrieve meaningful data, a trimmer head capable of holding three sets of lines was used to compare three different trimmer lines. The trimmer line composition described in Example 3, sample D1, was loaded onto an Echo® SRM-225 trimmer equipped with an Echo® 3-Line Rapid-Loader trimmer head. An 8.6 inch length of line was used. The trimmer line was used to trim vegetation alongside two commercially available trimmer lines: Shakespeare® NX747 Bi-Co trimmer line and Savage® Tri-Co trimmer line. The test was repeated 10 times (N=10). The results are presented in Table 7.

TABLE 7

Field Test Results

| | Average Weight Loss (%) | Std. Dev. (%) | First Quartile (%) | Third Quartile (%) |
|---|---|---|---|---|
| Formulation D1 | 35.1 | 5.5 | 30.6 | 38.1 |
| Shakespeare ® NX747 Bi-Co | 32.7 | 9.7 | 25.4 | 37.7 |
| Savage ® Tri-Co | 37.0 | 20.3 | 22.1 | 53.3 |

As shown in Table 7, the trimmer line formed from formula D1 performs similar to that of the two of the top commercial products, but with greater consistency. This is highly favorable in view of the following degradation results.

Example 5: Anaerobic Degradation Test

Formulas D1 and D2 in Example 3 were analyzed according to ASTM D5511 to determine anaerobic degradation performance. This test method creates anaerobic digestion conditions with more than 30% total solids. The sample material was exposed to a methanogenic inoculum derived from anaerobic digesters operating on pretreated household waste. The test measured the carbon conversion in the sample based on the gaseous carbon evolved under these conditions and determines a percent biodegradation based on that value. NX747 nylon alloy was used as the control. The results of the anaerobic degradation test are presented in Table 8.

TABLE 8

Results of Anaerobic Degradation Test

| Sample Time (Days) | Control (%) | Formulation D1 (%) | Formulation D2 (%) |
|---|---|---|---|
| 60 | 0.1 | 7.3 | 3.0 |
| 120 | 0.6 | 15.1 | 8.0 |
| 180 | 0.8 | 23.3 | 13.2 |
| 240 | 0.9 | 31.9 | 18.5 |
| 300 | 0.8 | 39.8 | 21.7 |
| 360 | 0.8 | 42.8 | 25.2 |
| 420 | 0.9 | 46.7 | 29.2 |
| 480 | 0.9 | 50.5 | 33.8 |
| 540 | 0.9 | 54.1 | 38.3 |
| 600 | — | 57.5 | — |

As shown in Table 8, the anaerobic degradation rate is enhanced significantly over the control. Anaerobic degradation is the fastest route for biodegradation quantification. Without intending to be bound by any particular theory, it is believed that compounding the trimmer line formulation with polycaprolactone increases uniformity of inclusion domains. This uniformity enables uniform introduction of microbes during the anaerobic degradation process, enabling degradation of the trimmer line in amount exceeding even the amount of biodegradable toughening agent present in the trimmer line.

Example 6: Aerobic Degradation Test

Formula D1 in Example 3 was analyzed according to ASTM D5338 to determine aerobic degradation performance. The test method was modified to run at 46° C. instead of 58° C. to better reflect performance in, for example, home composting. In ASTM D5338, the sample material is mixed into an environment with bacterial and fungal inoculum, and the lab uses respirometry to measure degradation based on CO2 evolution. A sample of cellulose was used as the control. The results of the aerobic degradation test are presented in Table 9.

TABLE 9

Results of Aerobic Degradation Test

| Day | Cellulose (%) | Formulation D1 (%) |
|---|---|---|
| 0 | 0 | 0 |
| 7 | 49.9 | 1 |
| 14 | 64.8 | 1.3 |
| 28 | 76.2 | 2 |
| 42 | 81.1 | 3 |
| 56 | 83.7 | 3.8 |
| 91 | 88.6 | 4.9 |

Example 7: Alternative Formulations

Alternative formulations were formed as detailed in Table 10.

TABLE 10

Alternative Formulations

| Formulation # | Major Component (present between 69-90%) | Polycaprolactone | Biodegradable components (present between 5-30%) |
|---|---|---|---|
| E | Nylon 6 | 1-10% | Starch, PBAT |
| F | Nylon 6 | 1-10% | PBS, PVA, |
| G | Nylon 6 | 1-10% | PBS, PBAT, PHA |
| H | Nylon 6 | 1-10% | PHA |
| I | Nylon 6 | 1-10% | PHA, PBS, PVA |
| J | Nylon 6 | 1-10% | PBS, PBAT |
| H | Nylon 6 | 1-10% | Starch, PBS |

As shown in Table 10, the biodegradable toughening agent may vary, and the relative amounts of each component can vary.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirit and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure is not to be seen as limited by the foregoing but is only limited by the scope of the appended claims.

That which is claimed is:

1. A trimmer line composition comprising a blend of:

a nylon component;

a biodegradable toughening agent different from polycaprolactone; and polycaprolactone, wherein the biodegradable toughening agent forms inclusion domains within the nylon component.

2. The trimmer line composition of claim 1, wherein the nylon component is present in an amount of from about 69% to about 90% by weight of the trimmer line composition.

3. The trimmer line composition of claim 1, wherein the biodegradable toughening agent is present in an amount of from about 5% to about 30% by weight of the trimmer line composition.

4. The trimmer line composition of claim 1, wherein the polycaprolactone is present in an amount of from about 1% to about 10% by weight of the trimmer line composition.

5. The trimmer line composition of claim 1, wherein the nylon component comprises nylon 6, nylon 66, nylon 610, nylon 12, nylon 6/66, nylon 66/6, nylon 6/69, nylon 6/610, nylon 6/611, copolymers thereof, or blends thereof.

6. The trimmer line composition of claim 1, wherein the nylon component has a sulfuric acid viscosity (SAV) of about 2.2 to about 5.0.

7. The trimmer line composition of claim 1, wherein the biodegradable toughening agent comprises starch, polyhydroxyalkanoate (PHA), polyhydroxybutyrate (PHB), polybutylene succinate (PBS), polybutylene adipate terephthalate (PBAT), polyvinyl alcohol (PVA), a copolymer thereof, or a blend thereof.

8. The trimmer line composition of claim 1, wherein the biodegradable toughening agent comprises a thermoplastic starch, the thermoplastic starch comprising pea starch, glycerin, and polybutylene succinate (PBS).

9. The trimmer line composition of claim 1, further comprising a stabilizer.

10. The trimmer line composition of claim 9, wherein the stabilizer comprises a blend of a hindered phenolic antioxidant and a phosphite.

11. The trimmer line composition of claim 1, wherein a trimmer line formed from the trimmer line composition experiences a weight loss in-use equal to or less than a conventional nylon-based trimmer line.

12. The trimmer line composition of claim 1, wherein at least 30% of the composition anaerobically degrades after 480 days, as measured by ASTM D5511.

13. The trimmer line composition of claim 1, wherein at least 4% of the composition aerobically degrades after 90 days, as measured by ASTM D5338 modified to run at 46° C.

14. The trimmer line composition of claim 1, wherein an enthalpy of first melting is from about 48 J/g to about 63 J/g.

15. The trimmer line composition of claim 14, wherein the enthalpy of first melting is from 7% to 30% lower than a conventional nylon-based composition.

16. A method of forming a trimmer line, the method comprising:

feeding a nylon component and polycaprolactone into a compounder;

feeding a biodegradable toughening agent different from polycaprolactone into the compounder; and compounding the nylon component, polycaprolactone, and biodegradable toughening agent to form a blended trimmer line composition, wherein the biodegradable toughening agent forms inclusion domains within the nylon component.

17. The method of claim 16, further comprising extruding the trimmer line composition through an extruder to form a trimmer line.

18. The method of claim 16, wherein the compounder is a twin screw compounder.

19. The method of claim 16, wherein the compounding is performed by a screw configured for both distributive and dispersive mixing.

* * * * *